United States Patent
Ahn et al.

(10) Patent No.: US 12,086,953 B2
(45) Date of Patent: Sep. 10, 2024

(54) IMAGE PROCESSING DEVICE AND OPERATING METHOD THEREOF

(71) Applicant: SAMSUNG ELECTRONICS CO., LTD., Suwon-si (KR)

(72) Inventors: Iljun Ahn, Suwon-si (KR); Soomin Kang, Suwon-si (KR); Hanul Shin, Suwon-si (KR); Tammy Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 375 days.

(21) Appl. No.: 17/687,162

(22) Filed: Mar. 4, 2022

(65) Prior Publication Data
US 2022/0284545 A1 Sep. 8, 2022

Related U.S. Application Data

(63) Continuation of application No. PCT/KR2022/002060, filed on Feb. 11, 2022.

(30) Foreign Application Priority Data

Mar. 4, 2021 (KR) .......... 10-2021-0029089
Jul. 23, 2021 (KR) .......... 10-2021-0097304

(51) Int. Cl.
G06T 3/4046 (2024.01)

(52) U.S. Cl.
CPC .. G06T 3/4046 (2013.01); *G06T 2207/20081* (2013.01); *G06T 2207/20084* (2013.01)

(58) Field of Classification Search
CPC ......... G06T 3/4046; G06T 2207/20081; G06T 2207/20084; G06F 16/54; G06N 3/08; G06N 3/0464
See application file for complete search history.

(56) References Cited

U.S. PATENT DOCUMENTS 5,822,467 A 10/1998 Lopez et al.
7,187,811 B2 3/2007 Lin et al.
(Continued)

FOREIGN PATENT DOCUMENTS

JP 2020-149560 A 9/2020
KR 10-2018-0136720 A 12/2018
WO 2020/113160 A2 6/2020

OTHER PUBLICATIONS

Soo Ye Kim et al., "KOALAnet: Blind Super-Resolution using Kernel-Oriented Adaptive Local Adjustment", Dec. 15, 2020, arXiv:2012.08103v1, 17 Pages, XP093022138.
(Continued)

*Primary Examiner* — Brandon J Miller
(74) *Attorney, Agent, or Firm* — Sughrue Mion, PLLC

(57) ABSTRACT

An image processing device, including a memory configured to store one or more instructions; and a processor configured to execute the one or more instructions stored in the memory to: obtain kernel coefficient information corresponding to each pixel of a plurality of pixels included in a first image, using a convolution neural network including one or more convolution layers, generate a spatially variant kernel including a kernel corresponding to the each pixel, based on a gradient kernel set including a plurality of gradient kernels corresponding to one or more gradient characteristics of the plurality of pixels, and the kernel coefficient information, and generate a second image, by applying the kernel included in the spatially variant kernel to a region centered on the each pixel, and filtering the first image.

15 Claims, 11 Drawing Sheets

(56) References Cited

U.S. PATENT DOCUMENTS

| | | |
|---|---|---|
| 8,855,213 B2 | 10/2014 | Filippini et al. |
| 10,448,014 B2 | 10/2019 | Possos et al. |
| 10,740,865 B2 | 8/2020 | Lee et al. |
| 10,839,483 B2 | 11/2020 | Kim et al. |
| 10,846,828 B2 | 11/2020 | Meyer et al. |
| 2004/0184657 A1 | 9/2004 | Lin et al. |
| 2005/0025383 A1 | 2/2005 | Domingo et al. |
| 2009/0052775 A1* | 2/2009 | Moon ............ H04N 23/81 382/167 |
| 2019/0251668 A1 | 8/2019 | Meyer et al. |
| 2020/0019860 A1 | 1/2020 | Konieczny |
| 2020/0120340 A1 | 4/2020 | Park et al. |
| 2020/0273151 A1 | 8/2020 | Smirnov |
| 2020/0293857 A1 | 9/2020 | Nakadai et al. |
| 2021/0255304 A1* | 8/2021 | Fontijne ............ G06V 20/58 |

OTHER PUBLICATIONS

Communication issued on Feb. 16, 2023 by the European Patent Office in European Patent Application No. 22705003.6.

International Search Report and Written Opinion issued May 20, 2022 by the International Searching Authority in International Application No. PCT/KR2022/002060 (PCT/ISA/220. PCT/ISA/210 and PCT/ISA/237).

Romano et al., "RAISR: Rapid and Accurate Image Super Resolution", Jan. 2017, IEEE Transactions on Computational Imaging, vol. 3, No. 1, 16 pages total.

Dong et al., "Compression Artifacts Reduction by a Deep Convolutional Network", 2015, ICCV, 9 pages total.

Zhang et al., "Beyond a Gaussian Denoiser: Residual Learning of Deep CNN for Image Denoising," 2016, arXiv:1608.03981v1 [cs.CV], 13 pages total.

\* cited by examiner

IMAGE PROCESSING DEVICE AND OPERATING METHOD THEREOF

CROSS-REFERENCE TO RELATED APPLICATIONS

This application is a bypass continuation application of International Application No. PCT/KR2022/002060, filed on Feb. 11, 2022, which claims priority to Korean Patent Application No. 10-2021-0029089, filed on Mar. 4, 2021, and Korean Patent Application No. 10-2021-0097304, filed on Jul. 23, 2021, in the Korean Intellectual Property Office, the disclosures of which are incorporated by reference herein in their entireties.

BACKGROUND

1. Field

The disclosure relates to an image processing device for enhancing the quality of an image by using a neural network, and an operating method thereof.

2. Description of Related Art

With the development of computer technology, data traffic has increased exponentially and artificial intelligence (AI) has become an important trend leading future innovation. Because AI may emulate the way people think, it can be practically applied in many ways to many industries. Representative AI technologies include pattern recognition, machine learning, expert systems, neural networks, natural language processing, etc.

A neural network models characteristics of human biological neurons via mathematical expressions, and uses an algorithm that emulates the human ability called learning. Through this algorithm, the neural network may generate mapping between input data and output data, and the capability of generating such mapping may be expressed as a learning capability of the neural network. Also, the neural network has a generalization capability of generating correct output data with respect to input data that is not used for training, based on training results.

When image processing such as denoising of an image is performed by using a deep neural network (e.g., a deep-layered convolution neural network (CNN)), applying the same kernel (filter) to each of pixels included in the image causes a problem in that performance of image processing degrades. Therefore, during image processing, it may be necessary to perform the image processing by applying different kernels according to a gradient characteristic of each of the pixels included in the image.

SUMMARY

According to various embodiments of the disclosure, provided are an image processing device capable of performing adaptive image processing according to a gradient characteristic of each of pixels included in an image by using a convolution neural network, and an operating method thereof.

The image processing device according to an embodiment of the disclosure may apply different kernels (filters) according to a gradient characteristic of each of a plurality of pixels included in an image, thereby enabling adaptive image processing according to the gradient characteristics of the pixels.

The image processing device according to an embodiment of the disclosure may perform denoising to remove noise while maintaining a detailed edge and texture of an input image, by using a convolution neural network.

The image processing device according to an embodiment of the disclosure may perform image processing, by applying different kernels according to quality information, for each region included in an image, and thus the performance of image processing may be improved.

DETAILED DESCRIPTION

Figure 1:
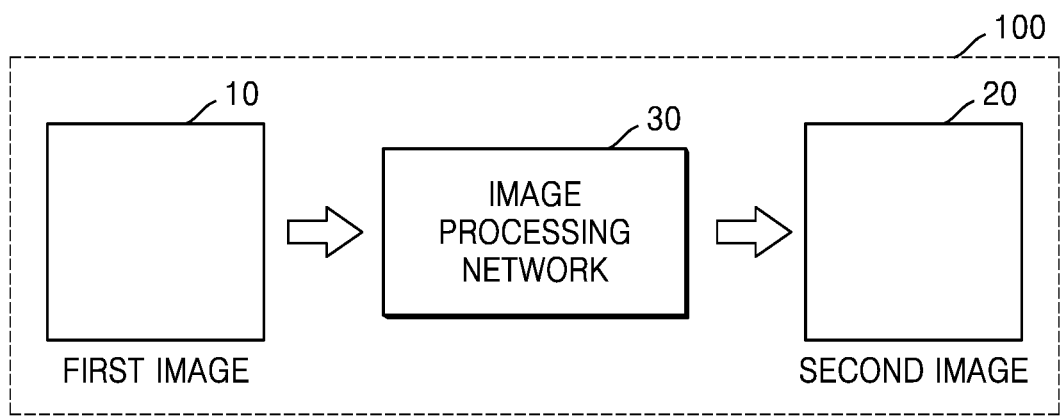
FIG. 1 is a diagram illustrating an operation, performed by an image processing device, of processing an image by using an image processing network, according to an embodiment.

In accordance with an aspect of the disclosure, an image processing device includes a memory configured to store one or more instructions; and a processor configured to execute the one or more instructions stored in the memory to: obtain kernel coefficient information corresponding to each pixel of a plurality of pixels included in a first image, using a convolution neural network including one or more convolution layers, generate a spatially variant kernel including a kernel corresponding to the each pixel, based on a gradient kernel set including a plurality of gradient kernels corresponding to one or more gradient characteristics of the plurality of pixels, and the kernel coefficient information, and generate a second image, by applying the kernel included in the spatially variant kernel to a region centered on the each pixel, and filtering the first image.

The one or more gradient characteristics of the plurality of pixels may include at least one of a strength characteristic, an angle characteristic, or a coherence represented by the plurality of pixels.

The plurality of gradient kernels may be trained using a training data set including low resolution images, and high resolution images respectively corresponding to the low resolution images, and the plurality of gradient kernels may be trained according to gradient characteristics of a plurality of image patches included in the low resolution images.

The plurality of gradient kernels may include a plurality of kernels trained according to a strength characteristic, an angle characteristic, and a coherence represented by the plurality of image patches.

A number of kernel coefficients included in the kernel coefficient information corresponding to the each pixel may be same as a number of the plurality of gradient kernels included in the gradient kernel set, and each kernel coefficient of the kernel coefficients included in the kernel coefficient information may represent a weight corresponding to each gradient kernel of the plurality of gradient kernels.

The spatially variant kernel may include a first kernel corresponding to a first pixel included in the first image and a second kernel corresponding to a second pixel included in the first image, and the processor may be further configured to execute the one or more instructions to: generate the first kernel by obtaining a weighted sum of first kernel coefficient information about the first pixel and the plurality of gradient kernels, and generate the second kernel, by obtaining a weighted sum of second kernel coefficient information about the second pixel and the plurality of gradient kernels.

The processor may be further configured to execute the one or more instructions to: generate the second image, by applying the first kernel to a first region centered on the first pixel and filtering the first image, and apply the second kernel to a second region centered on the second pixel and filtering the first image.

The processor may be further configured to execute the one or more instructions to: obtain quality information about at least one region included in the first image, select the gradient kernel set from among a plurality of gradient kernel sets, based on the quality information, and generate the kernel based on the kernel coefficient information and the gradient kernel set.

The processor may be further configured to execute the one or more instructions to: obtain first quality information about a first region included in the first image; generate a first kernel corresponding to a first pixel included in the first region, based on a first gradient kernel set corresponding to the first quality information from among the plurality of gradient kernel sets, and first kernel coefficient information corresponding to the first pixel; obtain second quality information about a second region included in the first image; and generate a second kernel corresponding to a second pixel included in the second region, based on a second gradient kernel set corresponding to the second quality information from among the plurality of gradient kernel sets, and second kernel coefficient information corresponding to the second pixel.

In accordance with an aspect of the disclosure, an operating method of an image processing device includes obtaining kernel coefficient information corresponding to each pixel of a plurality of pixels included in a first image, using a convolution neural network including one or more convolution layers, generating a spatially variant kernel including a kernel corresponding to the each pixel, based on a gradient kernel set including a plurality of gradient kernels corresponding to one or more gradient characteristics of the plurality of pixels, and the kernel coefficient information, and generating a second image, by applying the kernel included in the spatially variant kernel to a region centered on the each pixel and filtering the first image.

The one or more gradient characteristics of the plurality of pixels may include at least one of a strength characteristic, an angle characteristic, or a coherence represented by the plurality of pixels.

The plurality of gradient kernels may be trained using a training data set including low resolution images, and high resolution images respectively corresponding to the low resolution images, and the plurality of gradient kernels may be trained according to gradient characteristics of a plurality of image patches included in the low resolution images.

The plurality of gradient kernels may include a plurality of kernels trained according to a strength characteristic, an angle characteristic, and a coherence represented by the plurality of image patches.

A number of kernel coefficients included in the kernel coefficient information corresponding to the each pixel may be same as a number of the plurality of gradient kernels included in the gradient kernel set, and each kernel coefficient of the kernel coefficients included in the kernel coefficient information may represent a weight corresponding to each of the plurality of gradient kernels.

The spatially variant kernel may include a first kernel corresponding to a first pixel included in the first image and a second kernel corresponding to a second pixel included in the first image, the generating of the spatially variant kernel may include: generating the first kernel, by obtaining a weighted sum of first kernel coefficient information about the first pixel and the plurality of gradient kernels; and generating the second kernel, by obtaining a weighted sum of second kernel coefficient information about the second pixel and the plurality of gradient kernels.

The generating of the second image may include: applying the first kernel to a first region centered on the first pixel and filtering the first image; and applying the second kernel to a second region centered on the second pixel and filtering the first image.

The operating method may further include obtaining quality information about at least one region included in the first image; and selecting the gradient kernel set from among a plurality of gradient kernel sets, based on the quality information, and the generating of the spatially variant kernel further may include: generating the kernel based on the kernel coefficient information and the gradient kernel set.

The obtaining of the quality information may include: obtaining first quality information about a first region included in the first image; and obtaining second quality information about a second region included in the first image, and the generating of the spatially variant kernel further may include: generating a first kernel corresponding to a first pixel included in the first region, based on a first gradient kernel set corresponding to the first quality information from among the plurality of gradient kernel sets and first kernel coefficient information corresponding to the first pixel; and generating a second kernel corresponding to a second pixel included in the second region, based on a second gradient kernel set corresponding to the second quality information from among the plurality of gradient kernel sets and second kernel coefficient information corresponding to the second pixel.

In accordance with an aspect of the disclosure, a non-transitory computer-readable recording media has stored therein a program which, when executed by at least one processor, causes the at least one processor to: obtain kernel coefficient information corresponding to each pixel of a plurality of pixels included in a first image, using a convolution neural network including one or more convolution layers, generate a spatially variant kernel including a kernel corresponding to the each pixel, based on a gradient kernel set including a plurality of gradient kernels corresponding to one or more gradient characteristics of the plurality of pixels, and the kernel coefficient information, and generate a second image, by applying the kernel included in the spatially variant kernel to a region centered on the each pixel and filtering the first image.

In accordance with an aspect of the disclosure, an image processing device includes a memory configured to store one or more instructions; and a processor configured to execute the one or more instructions stored in the memory to: obtain kernel coefficient information corresponding to a pixel of a plurality of pixels included in a first image, using a convolution neural network including one or more convolution layers, generate a spatially variant kernel including a kernel corresponding to the pixel, based on a gradient kernel set including a plurality of gradient kernels corresponding to one or more gradient characteristics of the plurality of pixels, and the kernel coefficient information, and generate a second image, by applying the kernel included in the spatially variant kernel to a region centered on the pixel, and filtering the first image.

The method described above may be wholly or partly performed on an apparatus, i.e. an electronic device, using a machine learning or artificial intelligence model. The model may be processed by an artificial intelligence-dedicated processor designed in a hardware structure specified for artificial intelligence model processing. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

As mentioned above, the present techniques may be implemented using an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Throughout the disclosure, the expression "at least one of a, b or c" indicates only a, only b, only c, both a and b, both a and c, both b and c, all of a, b, and c, or variations thereof.

The terms used in the specification will be briefly defined, and embodiments of the disclosure will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

When a part "includes" or "comprises" an element, unless there is a particular description contrary thereto, the part may further include other elements, not excluding the other elements. In the following description, terms such as "unit" and "module" indicate a unit for processing at least one function or operation, wherein the unit and the block may be embodied as hardware or software or embodied by combining hardware and software.

As is traditional in the field, embodiments may be described and illustrated in terms of blocks which carry out a described function or functions. These blocks, which may be referred to herein as units or modules or the like, or by names such as driver, controller, device, engine, network, generator, filter, or the like, may be physically implemented by analog or digital circuits such as logic gates, integrated circuits, microprocessors, microcontrollers, memory circuits, passive electronic components, active electronic components, optical components, hardwired circuits, or the like, and may be driven by firmware and software. The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

Hereinafter, embodiments of the disclosure will be described in detail with reference to the accompanying drawings such that one of ordinary skill in the art may easily implement the embodiments of the disclosure. However, the embodiments of the disclosure may be implemented in many different forms and are not limited to those described herein.

In the drawings, components not related to the description are omitted for clear description of the disclosure, and like reference numerals in the drawings denote like or similar elements throughout the specification.

FIG. 1 is a diagram illustrating an operation, performed by an image processing device 100, of processing an image by using an image processing network 30 according to an embodiment of the disclosure.

Referring to FIG. 1, the image processing device 100 according to an embodiment of the disclosure may generate a second image 20, by processing a first image 10, by using the image processing network 30. In this regard, the first image 10 may be an image including noise or a low resolution image. The image processing device 100 may generate the second image 20, by performing denoising that removes noise while maintaining a detailed edge and texture of the first image 1, by using the image processing network 30. The second image 20 may be a higher resolution image than the first image 10, and may be an image with enhanced quality compared to the first image 10.

An example of image processing performed by the image processing network 30 according to an embodiment of the disclosure will be described in detail with reference to the drawings below.

Figure 2:
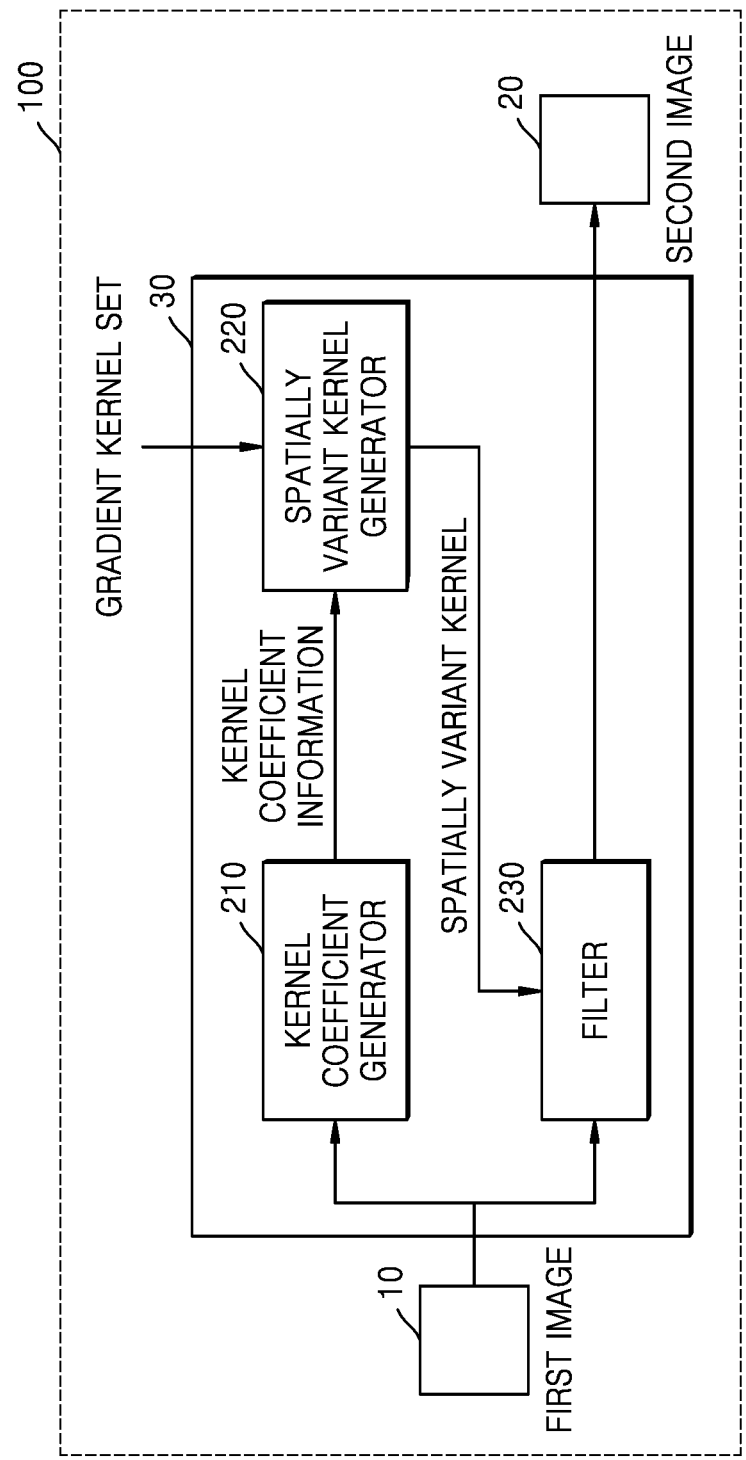
FIG. 2 is a diagram illustrating an image processing network according to an embodiment.

FIG. 2 is a diagram illustrating the image processing network 30 according to an embodiment of the disclosure.

Referring to FIG. 2, the image processing network 30 according to an embodiment of the disclosure may include a kernel coefficient generator 210, a spatially variant kernel generator 220, and a filter 230.

The image processing network 30 according to an embodiment of the disclosure may include a structure in which the first image 10 is received and the second image 20 is output.

The kernel coefficient generator 210 according to an embodiment of the disclosure may obtain kernel coefficient information corresponding to each of pixels included in the first image 10. An example of a method of obtaining the kernel coefficient information will be described in detail with reference to FIG. 3.

Figure 3:
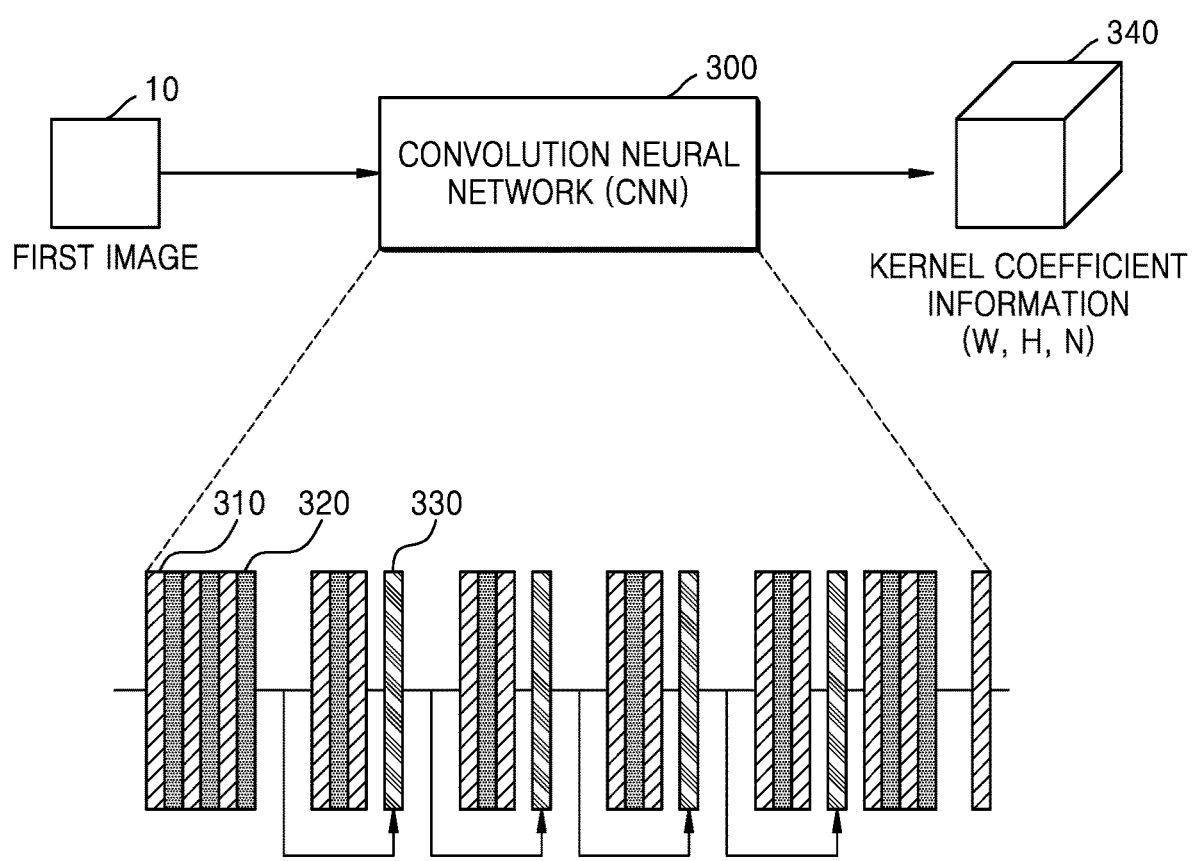
FIG. 3 is a reference diagram illustrating a method of obtaining kernel coefficient information, according to an embodiment.

FIG. 3 is a reference diagram illustrating a method of obtaining kernel coefficient information according to an embodiment of the disclosure.

Referring to FIG. 3, the kernel coefficient generator 210 may obtain the kernel coefficient information 340, by using a convolution neural network 300. The first image 10 input to the kernel coefficient generator 210 may pass through the convolution neural network 300, so that the kernel coefficient information 340 may be output from the kernel coefficient generator 210.

The convolution neural network 300 according to an embodiment of the disclosure may include one or more convolution layers 310 and one or more activation layers 320. In this regard, each of the activation layers 320 may be located after each of the convolution layers 310. For example, each of the activation layers 320 may be located after a corresponding one of the convolution layers 310.

The first image 10 may be input to a first layer included in the convolution neural network 300, and values output from a previous layer may be input to remaining layers. The convolution neural network 300 has a structure in which an operation is performed in each of the layers to obtain resultant values, and the obtained resultant values are output to a next layer. For example, in the convolution layer 310, a convolution operation between a kernel included in the convolution layer 310 and values input to the convolution layer 310 may be performed. An example of the operation performed in the convolution layer 310 will be described in detail with reference to FIGS. 4 and 5.

Figure 4:
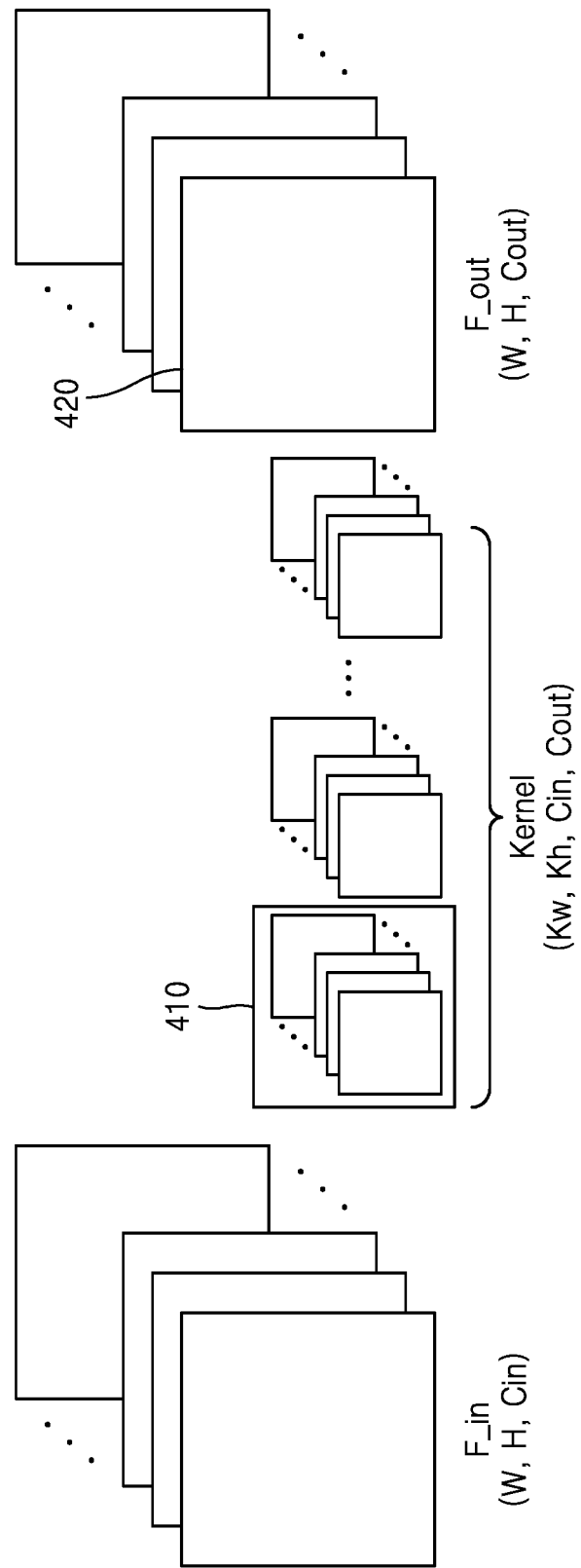
FIGS. 4 and 5 are reference diagrams illustrating a convolution operation performed in a convolution layer, according to an embodiment.
Figure 5:
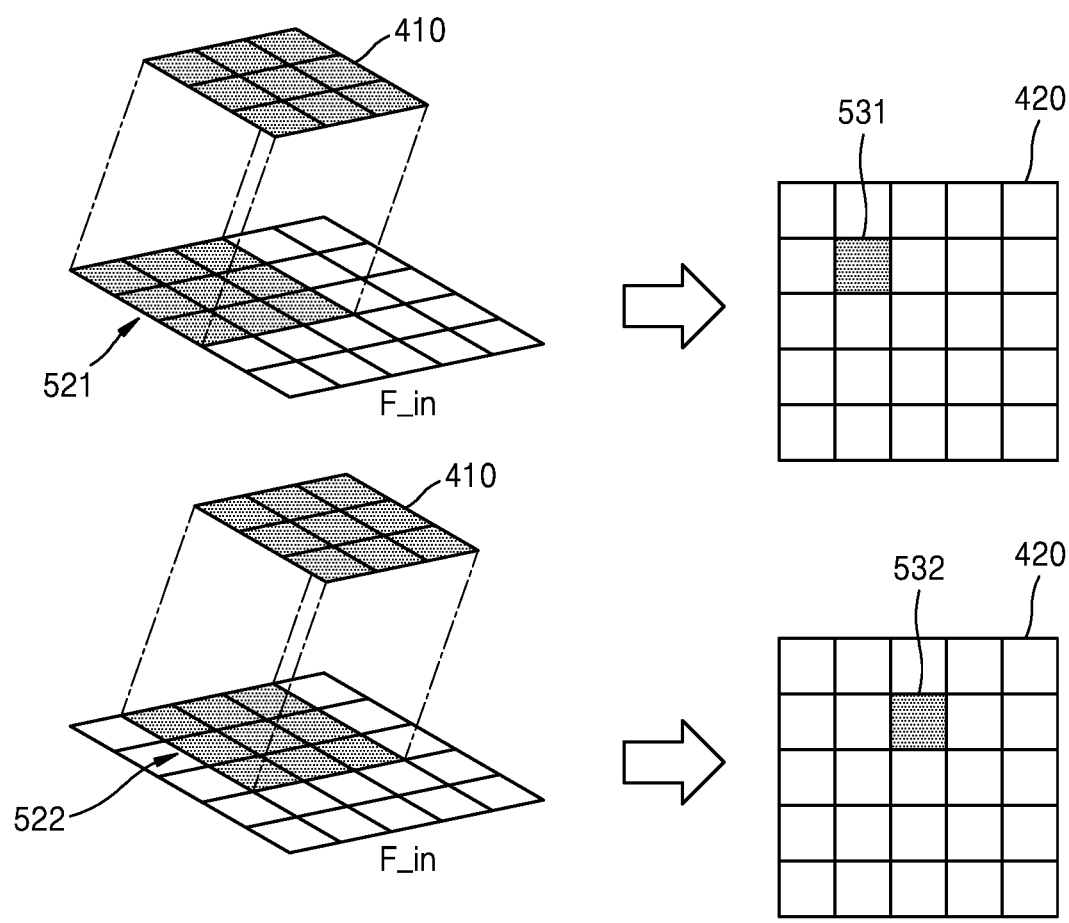

FIGS. 4 and 5 are reference diagrams illustrating a convolution operation performed in the convolution layer according to an embodiment of the disclosure.

FIG. 4 is a diagram illustrating an input image or an input feature map, F_in, which may be input to the convolution layer 310, a kernel included in the convolution layer 310, and an output image, or an output feature map, F_out, which may be output from the convolution layer 310 according to an embodiment of the disclosure.

Referring to FIG. 4, the size of the input image F_in input to the convolution layer 310 according to an embodiment of the disclosure may be W×H, and the number of channels may be $C_{in}$. In addition, the convolution layer 310 may include the kernel, and the kernel may include Cout sub-kernels. Also, one sub-kernel may have the size of Kw×Kh× $C_{in}$. The number $C_{in}$ of channels of one sub-kernel may be the same as the number $C_{in}$ of channels of the input image F_in. The convolution layer 310 may generate the output image F_out, by performing the convolution operation between the input image F_in and the kernel. In this regard, the size of the output image F_out may be W×H, and the number of channels of the output image F_out may be determined by the number Cout of sub-kernels of the kernel.

FIG. 5 is a reference diagram illustrating a process of generating a first channel image 420 of the output image F_out, through the convolution operation between the input image F_in and a first sub-kernel 410 included in the kernel, according to an embodiment of the disclosure.

In FIG. 5, for convenience of description, it is assumed that the size of the input image F_in is 5×5 and the number of channels is 1. Also, it is assumed that the size of one sub-kernel included in the kernel applied to the input image F_in is 3×3 and the number $C_{in}$ of channels is 1.

FIG. 5 illustrates a process of extracting a feature of the input image F_in, by applying the first sub-kernel 410 from an upper left to a lower right of the input image F_in. In this regard, the size of the first sub-kernel 410 is 3×3, and the number of channels is 1. For example, the convolution layer 310 may perform the convolution operation by applying the first sub-kernel 410 to pixels included in a 3×3 region 521 of the upper left of the input image F_in.

That is, the convolution layer 310 may generate one pixel value 531 mapped to the 3×3 region 521 of the upper left, by multiplying pixel values included in the 3×3 region 521 of the upper left by parameter values included in the first sub-kernel 410 and summing multiplied values.

In addition, the convolution layer 310 may generate one pixel value 532 mapped to a 3×3 region 522 moved one pixel to the right from the 3×3 region 521 of the upper left of the input image F_in, by multiplying pixel values included in the 3×3 region 522 by the parameter values included in the first sub-kernel 410 and summing multiplied values.

In the same manner, the convolution layer 310 may generate pixel values included in the first channel image 420 of the output image F_out, by multiplying the parameter values included in the first sub-kernel 410 by the pixel values of the input image F_in and summing multiplied values, while sliding the first sub-kernel 410 from the left to the right and from the top to the bottom by one pixel within the input image F_in. In this regard, target data of the convolution operation may be sampled while moving by one pixel, but may be sampled while moving by two or more pixels. A size of an interval between pixels sampled during a sampling process is referred to as a stride, and the size of the output image F_out may be determined according to the size of the stride. Also, as shown in FIG. 5, padding may be performed to make the size of output image F_out the same as that of the input image F_in. Padding may refer to increasing the size of the input image F_in, by giving a specific value (e.g., '0') to the edge of the input image F_in, in order to prevent the size of the output image F_out that is output from being reduced. When the convolution operation is performed after padding is performed, the size of the output image F_out may be the same as the size of the input image F_in. However, the disclosure is not limited thereto.

Meanwhile, although FIG. 5 illustrates only the result of the convolution operation on the first sub-kernel 410, which may be the first channel image 420 of the output image F_out, when the convolution operation is performed on Cout sub-kernels, the output image F_out including Cout channel images may be output. That is, the number of channels of the output image F_out may be determined according to the number of sub-kernels included in the kernel.

Referring back to FIG. 3, the activation layer 320 may be located after the convolution layer 310.

In the activation layer 320 according to an embodiment of the disclosure, an operation of applying an activation function to values input to the activation layer 320 may be performed. An operation of the activation function is to give a non-linear characteristic to first feature information, and the activation function may include a sigmoid function, a Tanh function, a Rectified Linear Unit (ReLU) function, a leaky ReLu function, etc., but is not limited thereto.

Also, the convolution neural network 300 may further include a layer 330 that performs an element-wise summation operation.

The element-wise summation operation may be an operation of adding values at the same position when each of values included in first input information and each of values included in second input information, which are input to the layer 330 that performs the summation operation for each element, are summed.

Referring to FIG. 3, the first image 10 input to the convolution neural network 300 may pass through the one or more convolution layers 310, the one or more activation layers 320, and the one or more layers 330 that perform the element-wise summation operation, which are included in the convolution neural network 300, so that the kernel coefficient information 340 corresponding to each of the pixels included in the first image 10 may be output. In this regard, the size of the first image 10 may be W×H, the size of the kernel coefficient information 340 corresponding to the first image 10 may be W×H, and the number of channels may be N. In this regard, N may be determined based on the number of a plurality of gradient kernels included in a gradient kernel set to be described later. An example of this will be described in detail with reference to FIG. 6.

Referring back to FIG. 2, the spatially variant kernel generator 220 according to an embodiment of the disclosure may generate a spatially variant kernel, based on the kernel coefficient information 340 generated by the kernel coefficient generator 210 and the gradient kernel set.

An example of a method of generating the spatially variant kernel according to an embodiment of the disclosure will be described in detail with reference to FIG. 6.

Figure 6:
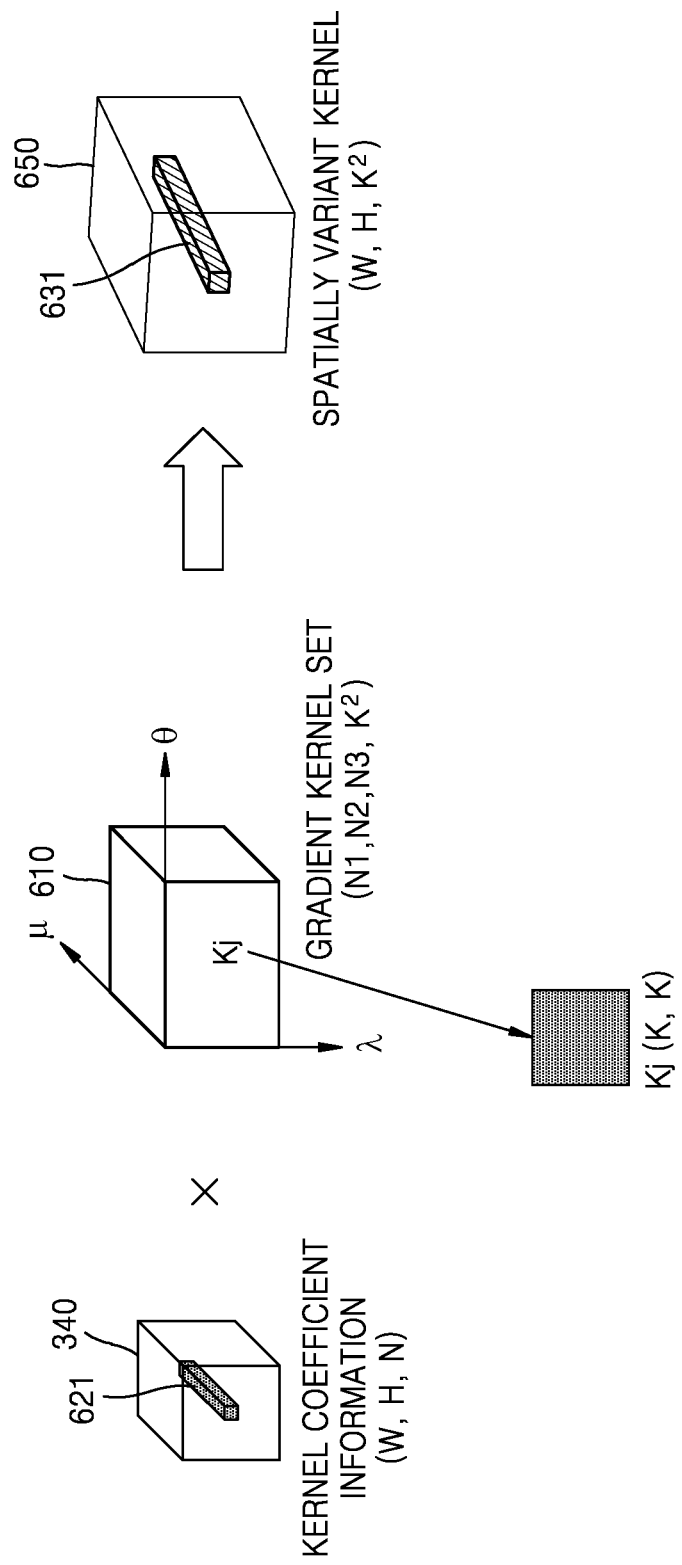
FIG. 6 is a reference diagram illustrating a method of generating a spatially variant kernel, according to an embodiment.

FIG. 6 is a reference diagram illustrating a method of generating a spatially variant kernel according to an embodiment of the disclosure.

A gradient kernel set 610 according to an embodiment of the disclosure may include a plurality of gradient kernels corresponding to a combination of one or more gradient characteristics of a pixel. The one or more gradient characteristics of the pixel may be determined based on a characteristic of an edge appearing in the pixel. Gradient characteristics according to an embodiment of the disclosure may include at least one of a strength characteristic, an angle characteristic, or a coherence.

In embodiments of the disclosure, for convenience of description, it is described that the gradient characteristics of the pixel include the strength characteristic, the angle characteristic, and the coherence, but is not limited thereto. For example, the strength characteristic may be determined such that the sharper the edge, the greater the strength. The angle characteristic may indicate a direction of the edge. The coherence may represent a measure of how directional the edge is. When the edge is straight, the coherence is higher than when the edge is curved.

Also, the gradient characteristics according to an embodiment of the disclosure may be determined, based on eigen values and eigen vectors calculated through an eigen analysis on a gradient value of the pixel.

The gradient kernel set 610 may be previously trained data. In this regard, learning of the gradient kernel set 610 may be performed by the image processing device 100 according to an embodiment of the disclosure or an external device. When learning of the gradient kernel set 610 is performed by the external device, the external device may transmit the previously trained gradient kernel set 610 to the image processing device 100. However, the disclosure is not limited thereto.

The gradient kernel set 610 may be trained, by using a training data set including low resolution images and high resolution images respectively corresponding to the low resolution images. For example, in order to generate a high resolution image by filtering the low resolution image, kernels (filters) according to gradient characteristics of a plurality of image patches included in the low resolution image may be determined through training. In this regard, gradient kernels corresponding to a combination of the gradient characteristics of the image patches may be trained, by using a machine learning method, but are not limited thereto.

The number of a plurality of gradient kernels included in the gradient kernel set 610 may be determined based on the number of gradient kernels according to a change in each of the gradient characteristics. For example, when the number of gradient kernels according to changes in values of a first gradient characteristic, for example the angle characteristic θ of the pixel is N1, the number of gradient kernels according to changes in values of a second gradient characteristic, for example the strength characteristic λ of the pixel is N2, and the number of gradient kernels according to changes in values of a third gradient characteristic, for example the coherence μ of the pixel is N3, the gradient kernel set 610 may include N1×N2×N3 gradient kernels. Also, the size of one gradient kernel Kj may be K×K.

Referring to FIG. 6, the spatially variant kernel generator 220 according to an embodiment of the disclosure may generate the spatially variant kernel 650, based on the kernel coefficient information 340 generated by the kernel coefficient generator 210 and the gradient kernel set 610.

The kernel coefficient information 340 may include N kernel coefficients respectively corresponding to the pixels. For example, as shown in FIG. 6, one pixel may include N kernel coefficients 621. In this regard, N may be N1×N2×N3. The kernel coefficient information 340 corresponding to each of pixels included in a first image may be expressed by Equation 1 below, $$C_i=(C_{i1},C_{i2},\ldots,C_{iN}) \quad \text{[Equation 1]}$$

where $C_i$ denotes kernel coefficient information corresponding to a pixel $P_i$ included in the first image. For example, first kernel coefficient information $C_i$ corresponding to the first pixel $P_1$ among the pixels included in the first image may include N kernel coefficients $C_{11}, C_{12}, \ldots, C_{1N}$.

Also, the gradient kernel set 610 may include N gradient kernels, where N may be N1×N2×N3. The gradient kernel set 610 may be expressed by Equation 2 below.

$$K_{set}=(K_1,K_2,\ldots,K_N) \quad \text{[Equation 2]}$$

Each of the N kernel coefficients corresponding to one pixel represents a weight corresponding to each of the N gradient kernels included in the gradient kernel set 610.

The spatially variant kernel generator 220 according to an embodiment of the disclosure may generate a kernel corresponding to each of the pixels included in the first image, by performing a weighted sum of the kernel coefficient information and the plurality of gradient kernels, as shown in Equation 3.

$$K_{pi} = \sum_{j=1}^{N} C_{ij} K_j \quad \text{[Equation 3]}$$

In Equation 3, $K_{pi}$ denotes a kernel corresponding to the pixel $P_i$, $C_{ij}$ denotes kernel coefficients corresponding to the pixel $P_i$, and $K_j$ denotes a plurality of gradient kernels. In this regard, $K_{pi}$ corresponding to each of the pixels may have a size of K×K in the same manner as $K_j$.

When a kernel generated for each pixel and having the size of K×K is represented in the form of a kernel vector 631 having a size of 1×1×K², the spatially variant kernel 650 corresponding to the first image 10 may have a size of W×H, and K² channels, as shown in FIG. 6. However, the spatially variant kernel 650 shown in FIG. 6 is only an embodiment of the disclosure, is not limited thereto, and may appear in various forms according to embodiments of the disclosure.

Referring back to FIG. 2, the spatially variant kernel generator 220 may output the generated spatially variant kernel 650 to the filter 230. The filter 230 may generate the second image 20, by receiving the first image 10 and applying the spatially variant kernel 650 to the first image 10. An example of a method of generating the second image 20, by applying the spatially variant kernel 650 to the first image 10, will be described in detail with reference to FIG. 8.

Figure 7:
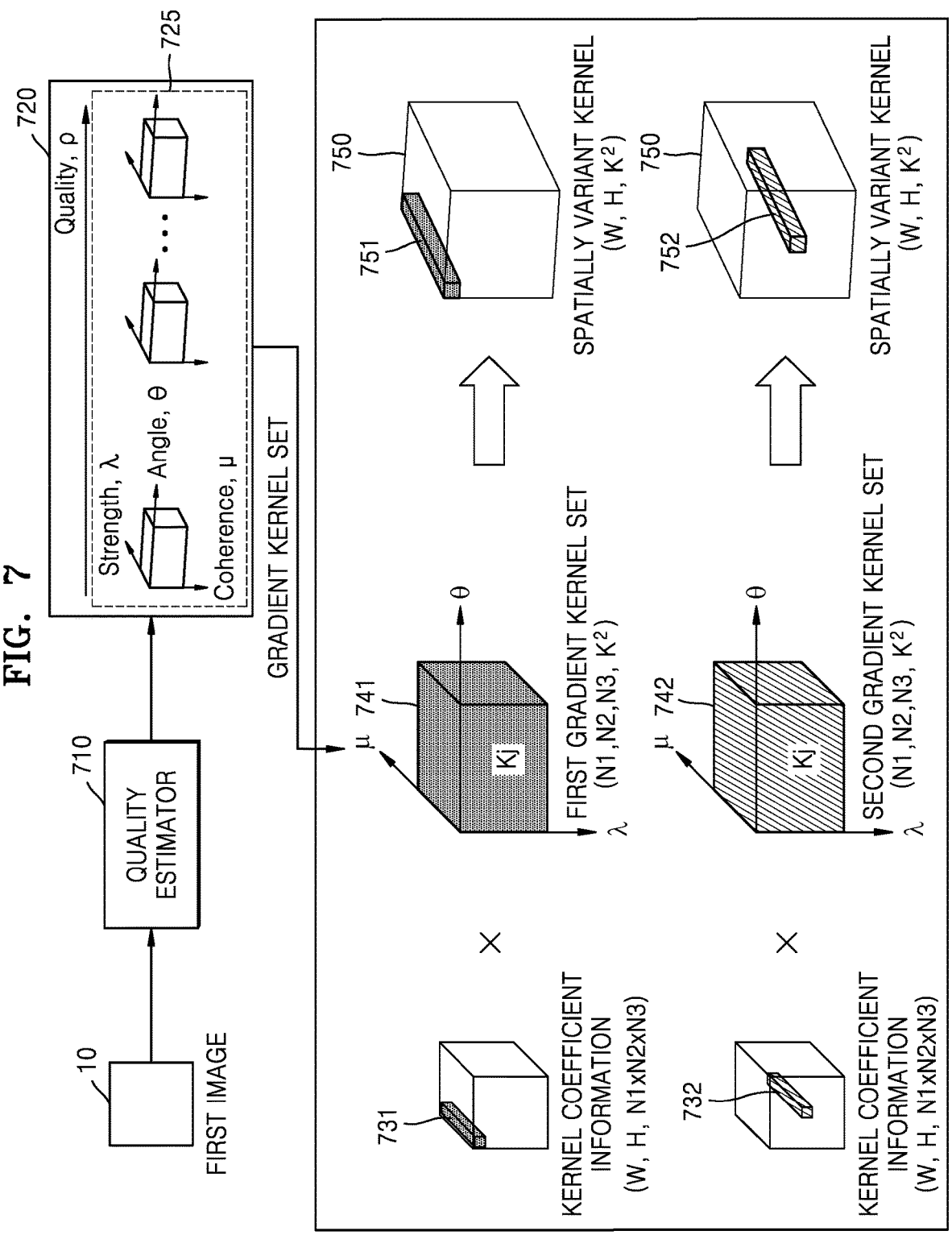
FIG. 7 is a reference diagram illustrating a method of generating a spatially variant kernel, according to another embodiment.

FIG. 7 is a reference diagram illustrating a method of generating a spatially variant kernel according to another embodiment of the disclosure.

Referring to FIG. 7, the image processing device 100 according to an embodiment of the disclosure may further include a quality estimator 710 that obtains quality information of the first image 10.

The quality estimator 710 according to an embodiment of the disclosure may obtain the quality information corresponding to the first image 10 or each of a plurality of regions included in the first image 10. The quality estimator 710 may estimate the quality of the entire first image 10 or each of the plurality of regions included in the first image 10, based on texture, edge, and noise information included in each of the plurality of regions. In this regard, the quality estimator 710 may obtain the quality information of the entire first image 10 or each of the plurality of regions, based on a previously trained quality estimation network. For example, the quality estimation network may be a network that receives an entire image or a region of an image and outputs a value of the quality of the image or the region, but is not limited thereto. Also, the quality estimator 710 may obtain the quality information of each pixel included in the first image 10.

A gradient kernel set selector 720 may select one of a plurality of gradient kernel sets 725, based on the quality information corresponding to the first image 10 or the quality information of each region included in the first image 10. In this regard, the plurality of gradient kernel sets 725 may be previously trained data. Also, learning of the plurality of gradient kernel sets 725 may be performed by the image processing device 100 according to an embodiment of the disclosure or an external device. When learning of the plurality of gradient kernel sets 725 is performed by the external device, the external device may transmit the plurality of previously trained gradient kernel sets 725 to the image processing device 100. However, the disclosure is not limited thereto.

Learning of the plurality of gradient kernel sets 725 may be performed in a similar manner to learning of the gradient kernel set 610 described with reference to FIG. 6. However, different gradient kernel sets according to the quality information may be generated, by training gradient kernels, by using low resolution images having different quality information. For example, a first gradient kernel set 741 corresponding to first quality information, for example when a value of the quality information is '0', may be generated, by learning the plurality of gradient kernel sets 725 using low resolution images having the first quality information and high resolution images corresponding to the low resolution images. Also, a second gradient kernel set 742 corresponding to second quality information, for example when the value of the quality information is '1', may be generated, by learning the plurality of gradient kernel sets 725 using low resolution images having the second quality information and high resolution images corresponding to the low resolution images. However, the disclosure is not limited thereto.

For example, when quality information of a first region including a first pixel includes the first quality information, the gradient kernel set selector 720 may select the first gradient kernel set 741 corresponding to the first quality information.

Accordingly, the spatially variant kernel generator 220 may generate a first kernel vector 751 corresponding to the first pixel, based on first kernel coefficient information 731 and the first gradient kernel set 741 corresponding to the first pixel. For example, the spatially variant kernel generator 220 may generate the first kernel vector 751 corresponding to the first pixel, by performing a weighted sum of the first kernel coefficient information 731 and a plurality of gradient kernels included in the first gradient kernel set 741.

Also, when quality information of a second region including a second pixel includes second quality information, the gradient kernel set selector 720 may select the second gradient kernel set 742 corresponding to the second quality information.

Accordingly, the spatially variant kernel generator 220 may generate a second kernel vector 752 corresponding to the second pixel, based on second kernel coefficient information 732 and the second gradient kernel set 742 corresponding to the second pixel. For example, the spatially variant kernel generator 220 may generate the second kernel vector 752 corresponding to the second pixel, by performing a weighted sum of the second kernel coefficient information 732 and a plurality of gradient kernels included in the second gradient kernel set 742.

In the same manner as above, the gradient kernel set selector 720 may select a gradient kernel set corresponding to the quality information of the first image 10 or the quality information of each region included in the first image 10 and transmit the selected gradient kernel set to the spatially variant kernel generator 220. In addition, the spatially variant kernel generator 220 may generate a kernel vector having a size of $1 \times 1 \times K^2$ for each pixel included in each region, by using the selected gradient kernel set of each region. Accordingly, the spatially variant kernel 750 including kernel vectors may have a size of W×H and $K^2$ channels, as shown in FIG. 7. However, the spatially variant kernel 750 illustrated in FIG. 7 is only an embodiment of the disclosure, is not limited thereto, and may appear in various forms according to embodiments of the disclosure.

Referring back to FIG. 2, the spatially variant kernel generator 220 may output the generated spatially variant kernel 750 to the filter 230. The filter 230 may generate a second image 20, by receiving the first image 10 and applying the spatially variant kernel 750 to the first image 10. An example of a method of generating the second image 20, by applying the spatially variant kernel 750 to the first image 10 will be described in detail with reference to FIG. 8.

Figure 8:
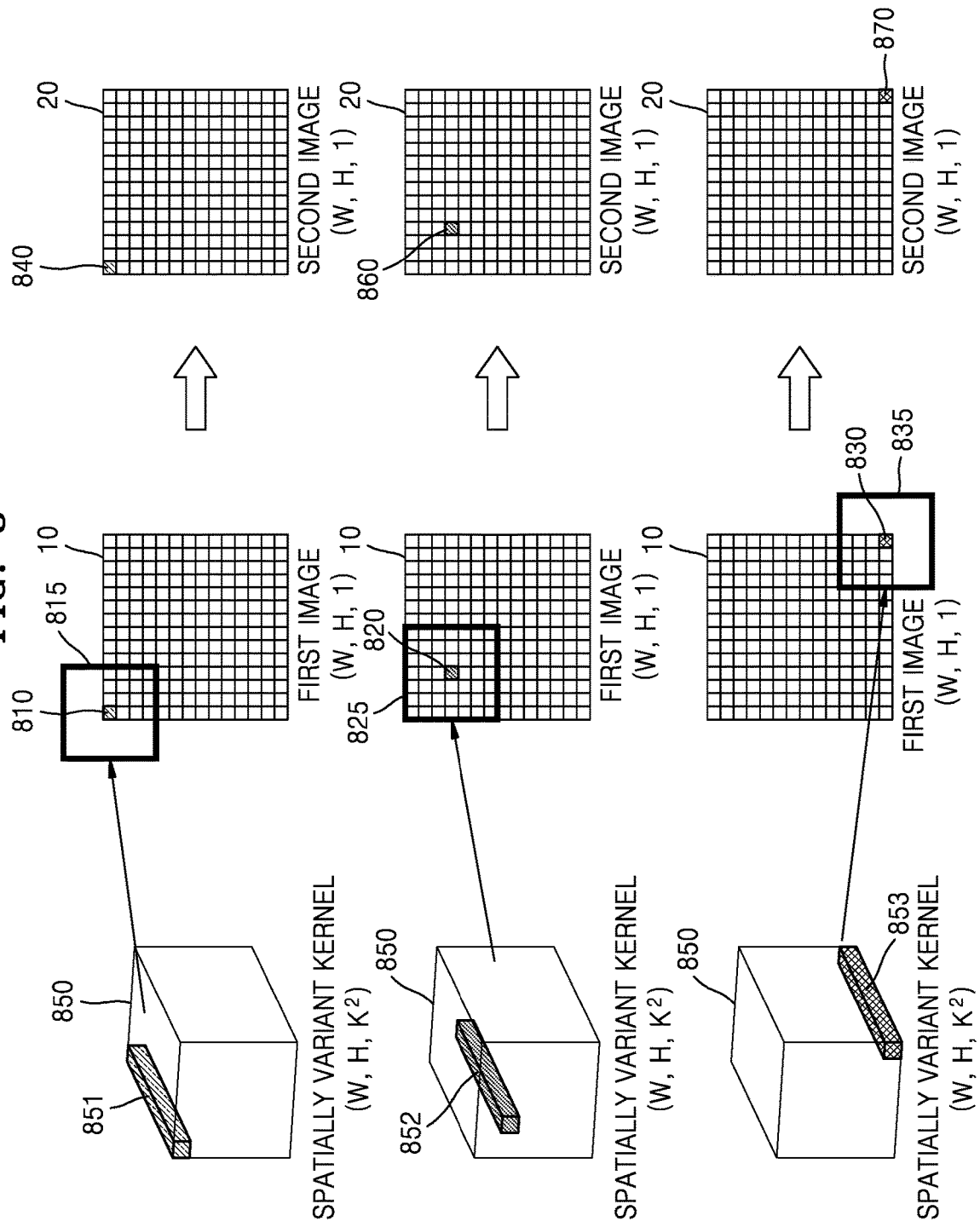
FIG. 8 is a reference diagram illustrating a method of applying a spatially variant kernel to a first image, according to an embodiment.

FIG. 8 is a reference diagram illustrating a method of applying a spatially variant kernel to the first image according to an embodiment of the disclosure.

Referring to FIG. 8, the spatially variant kernel 850 according to an embodiment of the disclosure may be the spatially variant kernel 650 of FIG. 6 or the spatially variant kernel 750 of FIG. 7, but is not limited thereto.

The spatially variant kernel 850 may include a kernel vector corresponding to each of pixels included in the first image 10. For example, the spatially variant kernel 850 may include a first kernel vector 851 corresponding to a first pixel 810 included in the first image 10, and a second kernel vector 852 corresponding to a second pixel 820 included in the first image 10. Also, the spatially variant kernel 850 may include a third kernel vector 853 corresponding to a third pixel 830 included in the first image 10.

The filter 230 may convert a one-dimensional kernel vector having a size of $1 \times 1 \times K^2$ into a two-dimensional kernel having a size of K×K. For example, the filter 230 may convert the first kernel vector 851 into a first kernel 815, the second kernel vector 852 into a second kernel 825, and the third kernel vector 853 into a third kernel 835.

The filter 230 may calculate a value of a fourth pixel 840 of the second image 20, by applying the first kernel 815 to a first region centered on the first pixel 810 included in the first image 10 and filtering the first region. The filter 230 may calculate a value of a fifth pixel 860 of the second image 20, by applying the second kernel 825 to a second region centered on the second pixel 820 included in the first image 10 and filtering the second region. The filter 230 may calculate a value of a sixth pixel 870 of the second image 20, by applying the third kernel 835 to a third region centered on the third pixel 830 included in the first image 10 and filtering the third region.

In the same manner as above, the filter 230 may calculate pixel values included in the second image 20, by applying a kernel corresponding to each of pixels included in the first image 10 to a region centered on each of the pixels included in the first image 10 and filtering the first image 10.

Figure 9:
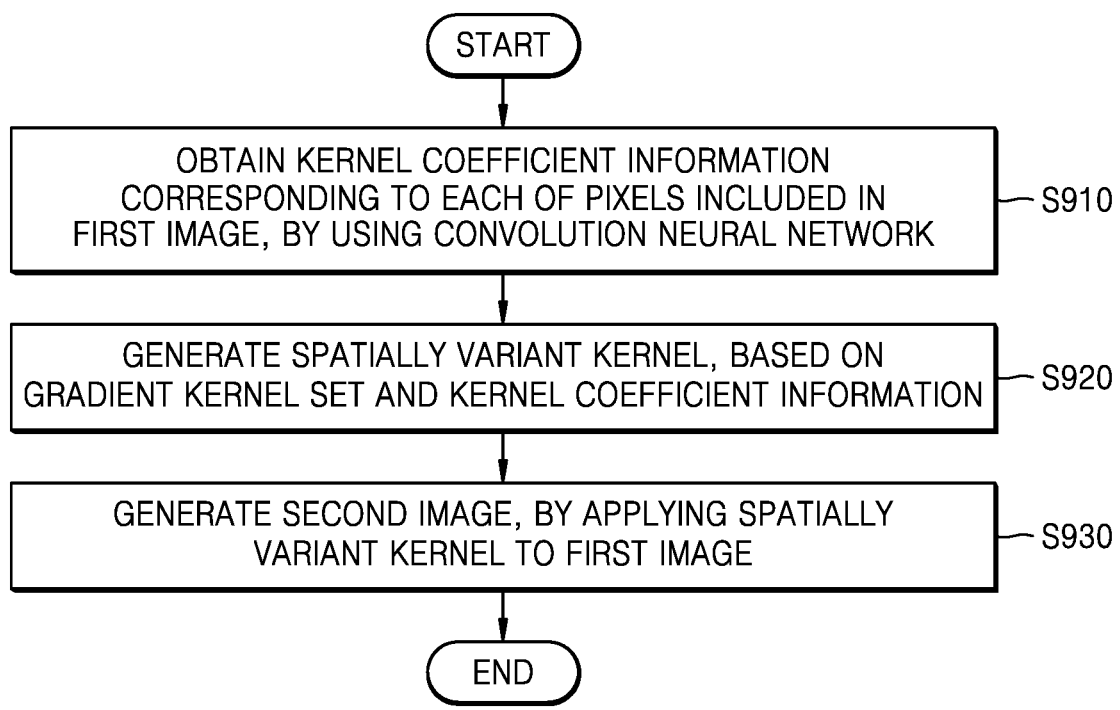
FIG. 9 is a flowchart illustrating an operating method of an image processing device, according to an embodiment.

FIG. 9 is a flowchart illustrating an operating method of the image processing device 100 according to an embodiment of the disclosure.

Referring to FIG. 9, image processing device 100 according to an embodiment of the disclosure may obtain kernel coefficient information corresponding to each of pixels included in a first image, by using a convolution neural network, in operation S910.

The image processing device 100 according to an embodiment of the disclosure may input the first image to the convolution neural network. When the input first image passes through the convolution neural network, the kernel coefficient information may be output. In this regard, the convolution neural network may include one or more convolution layers, one or more activation layers, and one or more element-wise summation layers. An example of a method of obtaining the kernel coefficient information has been described in detail with reference to FIGS. 3 to 5, and thus a detailed description thereof is omitted.

The image processing device 100 may generate a spatially variant kernel, based on a gradient kernel set and the kernel coefficient information, in operation S920.

The gradient kernel set according to an embodiment of the disclosure may include a plurality of gradient kernels corresponding to a combination of one or more gradient characteristics of a pixel. The one or more gradient characteristics of the pixel may be determined based on a characteristic of an edge appearing in the pixel. Gradient characteristics according to an embodiment of the disclosure may include at least one of a strength characteristic, an angle characteristic, or a coherence.

The gradient kernel set may be previously trained data. In this regard, learning of the gradient kernel set may be performed by the image processing device 100 according to an embodiment of the disclosure or an external device. When learning of the gradient kernel set is performed by the external device, the external device may transmit the previously trained gradient kernel set to the image processing device 100. However, the disclosure is not limited thereto.

The kernel coefficient information obtained in operation S910 may include N kernel coefficients respectively corresponding to pixels, and the gradient kernel set may include N gradient kernels. An example of this has been described in detail with reference to FIG. 6, and thus a detailed description thereof is omitted.

Each of the N kernel coefficients corresponding to one pixel represents a weight corresponding to each of the N gradient kernels. The image processing device 100 may generate a kernel corresponding to one pixel, by performing a weighted sum of the N kernel coefficients and the N gradient kernels.

Accordingly, the image processing device 100 may generate a kernel having a size of K×K for each pixel included in the first image 10, and when converting the kernel having the size of K×K into a kernel vector having a size of $1 \times 1 \times K^2$, generate a spatially variant kernel corresponding to the first image 10.

The image processing device 100 according to an embodiment of the disclosure may generate a second image, by applying the spatially variant kernel to the first image 10, in operation S930.

The spatially variant kernel generated in operation S920 may include a kernel vector corresponding to each of the pixels included in the first image 10. For example, the spatially variant kernel may include a first kernel vector corresponding to a first pixel included in the first image 10, and may include a second kernel vector corresponding to a second pixel included in the first image 10.

The image processing device 100 may convert a one-dimensional kernel vector having a size of 1×1×K² into a two-dimensional kernel having a size of K×K. For example, the image processing device 100 may convert the first kernel vector into a two-dimensional first kernel, and the second kernel vector into a two-dimensional second kernel.

The image processing device 100 may calculate a value of a third pixel included in the second image, by applying the first kernel to a region centered on the first pixel and filtering the first image 10, and calculate a value of a fourth pixel included in the second image, by applying the second kernel to a region centered on the second pixel and filtering the first image 10.

Accordingly, the image processing device 100 may filter the first image by applying different kernels according to the position of a center pixel.

Figure 10:
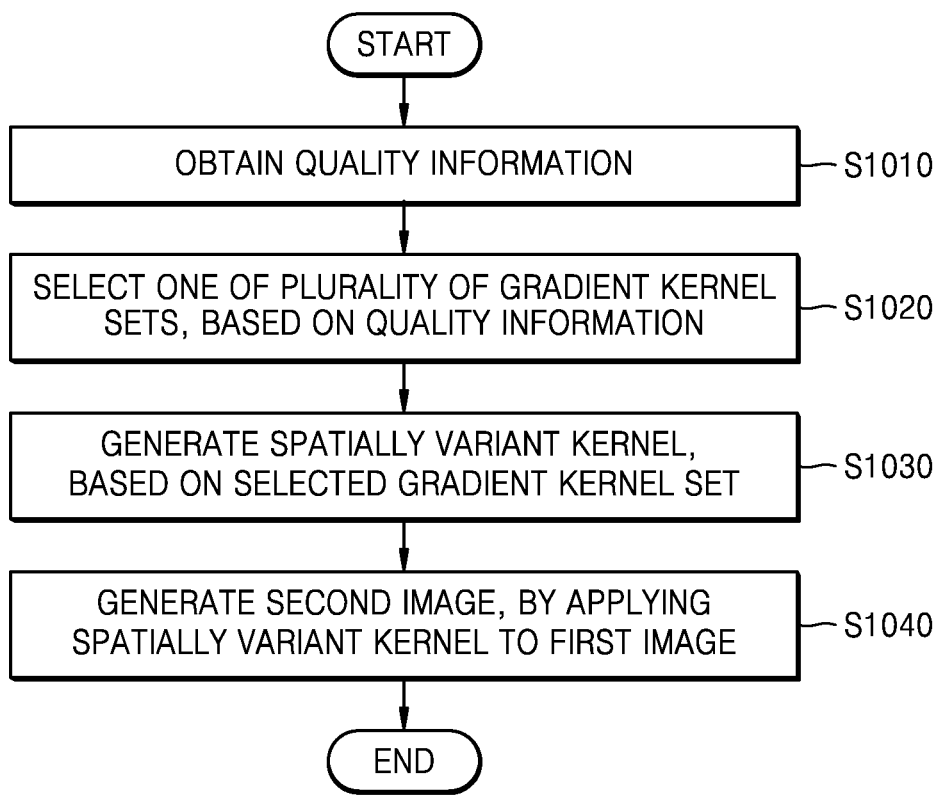
FIG. 10 is a flowchart illustrating an operating method of an image processing device, according to another embodiment.

FIG. 10 is a flowchart illustrating an operating method of the image processing device 100 according to another embodiment of the disclosure.

Referring to FIG. 10, the image processing device 100 according to another embodiment of the disclosure may obtain quality information of a first image, in operation S1010.

For example, the image processing device 100 may obtain the quality information corresponding to the first image or each of a plurality of regions included in the first image. The image processing device 100 may estimate the quality of the entire first image or each of the plurality of regions included in the first image, based on texture, edge, and noise information included in the first image or each of the plurality of regions. The image processing device 100 may obtain the quality information of the entire first image or each of the plurality of regions, based on a previously trained quality estimation network. For example, the quality estimation network may be a network that receives an entire image or a region of an image and outputs a value of the quality of the image or the region, but is not limited thereto. Also, the image processing device 100 may obtain the quality information of each pixel included in the first image.

The image processing device 100 may select one of a plurality of gradient kernel sets, based on the quality information, in operation S1020.

In this regard, the plurality of gradient kernel sets may be previously trained data. An example of a method of training the plurality of gradient kernel sets has been described in detail with reference to FIG. 7, and thus a detailed description thereof is omitted.

For example, when quality information of a first region includes first quality information, for example indicating a first quality, the image processing device 100 may select a first gradient kernel set corresponding to the first quality information, and when quality information of a second region includes second quality information, for example indicating a second quality, the image processing device 100 may select a second gradient kernel set corresponding to the second quality information.

The image processing device 100 may generate a spatially variant kernel, based on the selected gradient kernel set, in operation S1030.

For example, the image processing device 100 may generate the spatially variant kernel, based on kernel coefficient information and the selected gradient kernel set. In this regard, an example of a method of obtaining the kernel coefficient information has been described in detail with reference to operation S910 of FIG. 9, and thus a detailed description thereof is omitted.

The image processing device 100 may generate a first kernel vector corresponding to a first pixel, by performing a weighted sum of a plurality of gradient kernels included in a selected first gradient kernel set, in correspondence to first kernel coefficient information corresponding to the first pixel included in the first image and the first region in operation S1020.

Also, the image processing device 100 may generate a second kernel vector corresponding to a second pixel, by performing a weighted sum of a plurality of gradient kernels included in a selected second gradient kernel set, in correspondence to second kernel coefficient information corresponding to the second pixel included in the second image and the second region in operation S1020.

In the same manner as above, the image processing device 100 may generate a kernel vector for each pixel included in a region, by using the gradient kernel set selected for each region, and accordingly, may generate the spatially variant kernel including kernel vectors.

The image processing device 100 may generate the second image, by applying the spatially variant kernel generated in operation S1030 to the first image, in operation S1040. Operation S1040 of FIG. 10 may correspond to operation S930 of FIG. 9, and thus a detailed description thereof is omitted.

Figure 11:
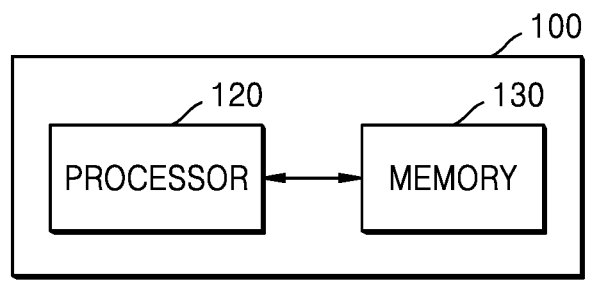
FIG. 11 is a block diagram of a configuration of an image processing device, according to an embodiment.

FIG. 11 is a block diagram of a configuration of the image processing device 100, according to an embodiment of the disclosure.

Referring to FIG. 11, the image processing device 100 according to an embodiment of the disclosure may include a processor 120 and a memory 130.

The processor 120 according to an embodiment of the disclosure may control overall operations of the image processing device 100. The processor 120 according to an embodiment of the disclosure may execute at least one program stored in the memory 130.

The memory 130 according to an embodiment of the disclosure may store various types of data, programs, or applications for driving and controlling the image processing device 100. The program stored in the memory 130 may include one or more instructions. The program, for example the one or more instructions, or application stored in the memory 130 may be executed by the processor 120.

The processor 120 according to an embodiment of the disclosure may include at least one of a central processing unit (CPU), a graphic processing unit (GPU), or a video processing unit (VPU). According to an embodiment of the disclosure, the processor 120 may be implemented in the form of a system on chip (SoC) in which at least one of the CPU, the GPU, or the VPU is integrated. In embodiments, the processor 120 may further include a neural processing unit (NPU).

The processor 120 according to an embodiment of the disclosure may generate an output image by performing denoising that processes a detailed edge and maintains texture while removing noise of an input image, by using the image processing network 30. For example, the processor 120 may perform at least one of operations of the kernel coefficient generator 210, the spatially variant kernel generator 220, the filter 230, the quality estimator 710, or the gradient kernel set selector 720 illustrated and described with reference to FIGS. 2 to 10.

The processor 120 may obtain kernel coefficient information corresponding to each of pixels included in a first image, by using a convolution neural network. The processor 120 may input the first image to the convolution neural network. The input first image may pass through the convolution neural network, so that the kernel coefficient information may be output. In this regard, the convolution neural network may include one or more convolution layers, one or more activation layers, and one or more element-wise summation layers. An example of a method of obtaining the kernel coefficient information has been described in detail with reference to FIGS. 3 to 5, and thus a detailed description thereof is omitted.

The processor 120 may generate a spatially variant kernel, based on a gradient kernel set and the kernel coefficient information The gradient kernel set according to an embodiment of the disclosure may include a plurality of gradient kernels corresponding to a combination of one or more gradient characteristics of a pixel. The one or more gradient characteristics of the pixel may be determined based on a characteristic of an edge appearing in the pixel. Gradient characteristics according to an embodiment of the disclosure may include at least one of a strength characteristic, an angle characteristic, or a coherence. The gradient kernel set may be previously trained data.

Also, the processor 120 may obtain quality information of the first image or each of regions included in the first image, and select one of a plurality of gradient kernel sets, based on the obtained quality information.

The kernel coefficient information may include N kernel coefficients respectively corresponding to pixels, and the gradient kernel set may include N gradient kernels. An example of this has been described in detail with reference to FIG. 6, and thus a detailed description thereof is omitted.

Each of the N kernel coefficients corresponding to one pixel represents a weight corresponding to each of the N gradient kernels. The processor 120 may generate a kernel corresponding to one pixel, by performing a weighted sum of the N kernel coefficients and the N gradient kernels.

Accordingly, the processor 120 may generate a kernel having a size of K×K for each pixel included in the first image, and when converting the kernel having the size of K×K into a kernel vector having a size of 1×1×K$^2$, generate a spatially variant kernel corresponding to the first image.

The processor 120 may generate a second image, by applying the spatially variant kernel to the first image The spatially variant kernel may include a kernel vector corresponding to each of the pixels included in the first image. For example, the spatially variant kernel may include a first kernel vector corresponding to a first pixel included in the first image, and may include a second kernel vector corresponding to a second pixel included in the first image.

The processor 120 may convert a one-dimensional kernel vector having a size of 1×1×K$^2$ into a two-dimensional kernel having a size of K×K. For example, the processor 120 may convert the first kernel vector into a two-dimensional first kernel, and the second kernel vector into a two-dimensional second kernel. The processor 120 may calculate a value of a third pixel included in the second image, by applying the first kernel to a first region centered on the first pixel and filtering the first region, and calculate a value of a fourth pixel included in the second image, by applying the second kernel to a second region centered on the second pixel and filtering the second region.

Meanwhile, the image processing network 30 according to an embodiment of the disclosure may be a server or a network trained by an external device. The external device may train the image processing network 30, based on training data. In this regard, the training data may include a plurality of data sets including image data including noise and image data from which noise is removed and in which an edge characteristic or a texture characteristic is preserved.

The server or the external device may determine parameter values included in kernels used in each of a plurality of convolution layers included in the image processing network 30, for example a plurality of convolution layers included in the convolution neural network 300 of FIG. 3. For example, the server or the external device may determine parameter values in a direction of reducing a difference (loss information) between image data generated by the image processing network 30 and the image data, as the training data, from which noise is removed and in which the edge characteristic is preserved.

The image processing device 100 according to an embodiment of the disclosure may receive the image processing network 30 or the convolution neural network 300 in which training has been completed from the server or the external device and store the image processing network 30 or the convolution neural network 300 in the memory 130. For example, the memory 130 may store the structure and parameter values of the image processing network 30 or the convolution neural network 300 according to an embodiment of the disclosure, and the processor 120 may generate the second image from which noise is removed from the first image according to an embodiment of the disclosure and in which the edge characteristic is preserved, by using the parameter values stored in the memory 130.

Meanwhile, the block diagram of the image processing device 100 of FIG. 11 is a block diagram according to an embodiment of the disclosure. Based on a specification of the image processing device 100 actually implemented, components may be integrated, another component may be added, or a component may be omitted. In other words, two or more components may be integrated as one component or one component may be divided into two or more components when necessary. Also, a function performed by each block is for describing embodiments of the disclosure and detailed operations or a device do not limit the scope of the disclosure.

An operating method of an image processing device, according to an embodiment of the disclosure, may be recorded on a non-transitory computer-readable recording medium by being implemented in the form of program commands executed by using various computers. The non-transitory computer-readable recording medium may include at least one of a program command, a data file, or a data structure. The program commands recorded in the non-transitory computer-readable recording medium may be specially designed or well known to one of ordinary skill in the computer software field. Examples of the non-transitory computer-readable recording medium include hardware devices specially configured to store and perform program commands, such as magnetic media such as hard disks, floppy disks, and magnetic tapes, optical media such as CD-ROMs and DVDs, magneto-optical media such as floptical disks, and ROMs, RAMs, and flash memories. Examples of the program command include not only machine codes generated by a compiler, and but also include high-level language codes executable by a computer by using an interpreter.

Also, an image processing device and an operating method of the image processing device, according to embodiments of the disclosure, may be provided by being included in a computer program product. The computer program product may be traded between a seller and a buyer as a product.

The computer program product may include software (S/W) program or a non-transitory computer-readable storage medium in which an S/W program is stored. For example, the computer program product may include a product (for example, a downloadable application) in a form of an SAN program distributed electronically through a manufacturer of an electronic device or an electronic market (e.g., Google Play™ Store or App Storer™). For electronic distribution, at least a part of the S/W program may be stored in a storage medium or temporarily generated. In this case, the storage medium may be a server of a manufacturer, a server of an electronic market, or a storage medium of a relay server that temporarily stores an S/W program.

The computer program product may include a storage medium of a server or a storage medium of a client device in a system including the server and the client device. In embodiments, when there is a third device, for example, a smartphone, communicably connected to the server or client device, the computer program product may include a storage medium of the third device. In embodiments, the computer program product may include the S/W program itself transmitted from the server to the client device or to the third device, or transmitted from the third device to the client device.

In this case, one of the server, the client device, and the third device may execute the computer program product to perform the method according to embodiments of the disclosure. In embodiments, two or more of the server, client device, and third device may execute the computer program product to distribute and perform the method according to embodiments of the disclosure.

For example, the server, for example a cloud server or an AI server, may execute the computer program product stored on the server to control the client device communicably connected to the server to perform the method according to embodiments of the disclosure.

While embodiments of disclosure have been particularly described, the scope of the disclosure is not limited thereto, and it will be understood by one of ordinary skill in the art that various changes and modifications using the basic concept of the disclosure defined by the following claims are also within the scope of the disclosure.

The invention claimed is:

1. An image processing device comprising:
a memory configured to store one or more instructions; and
a processor configured to execute the one or more instructions stored in the memory to:
obtain kernel coefficient information corresponding to each pixel of a plurality of pixels included in a first image, using a convolution neural network comprising one or more convolution layers,
generate a spatially variant kernel comprising a kernel corresponding to the each pixel, based on a gradient kernel set comprising a plurality of gradient kernels corresponding to one or more gradient characteristics of the plurality of pixels, and the kernel coefficient information, and
generate a second image, by applying the kernel included in the spatially variant kernel to a region centered on the each pixel, and filtering the first image.

2. The image processing device of claim 1, wherein the one or more gradient characteristics of the plurality of pixels comprise at least one of a strength characteristic, an angle characteristic, or a coherence represented by the plurality of pixels.

3. The image processing device of claim 1, wherein the plurality of gradient kernels are trained using a training data set comprising low resolution images, and high resolution images respectively corresponding to the low resolution images, and
wherein the plurality of gradient kernels are trained according to gradient characteristics of a plurality of image patches included in the low resolution images.

4. The image processing device of claim 3, wherein the plurality of gradient kernels comprise a plurality of kernels trained according to a strength characteristic, an angle characteristic, and a coherence represented by the plurality of image patches.

5. The image processing device of claim 1, wherein a number of kernel coefficients included in the kernel coefficient information corresponding to the each pixel is same as a number of the plurality of gradient kernels included in the gradient kernel set, and
wherein each kernel coefficient of the kernel coefficients included in the kernel coefficient information represents a weight corresponding to each gradient kernel of the plurality of gradient kernels.

6. The image processing device of claim 5, wherein the spatially variant kernel comprises a first kernel corresponding to a first pixel included in the first image and a second kernel corresponding to a second pixel included in the first image, and
wherein the processor is further configured to execute the one or more instructions to:
generate the first kernel by obtaining a weighted sum of first kernel coefficient information about the first pixel and the plurality of gradient kernels, and
generate the second kernel, by obtaining a weighted sum of second kernel coefficient information about the second pixel and the plurality of gradient kernels.

7. The image processing device of claim 6, wherein the processor is further configured to execute the one or more instructions to:
generate the second image, by applying the first kernel to a first region centered on the first pixel and filtering the first image, and
apply the second kernel to a second region centered on the second pixel and filtering the first image.

8. The image processing device of claim 1, wherein the processor is further configured to execute the one or more instructions to:
obtain quality information about at least one region included in the first image,
select the gradient kernel set from among a plurality of gradient kernel sets, based on the quality information, and
generate the kernel based on the kernel coefficient information and the gradient kernel set.

9. The image processing device of claim 8, wherein the processor is further configured to execute the one or more instructions to:
obtain first quality information about a first region included in the first image;
generate a first kernel corresponding to a first pixel included in the first region, based on a first gradient kernel set corresponding to the first quality information from among the plurality of gradient kernel sets, and first kernel coefficient information corresponding to the first pixel;
obtain second quality information about a second region included in the first image; and generate a second kernel corresponding to a second pixel included in the second region, based on a second gradient kernel set corresponding to the second quality information from among the plurality of gradient kernel sets, and second kernel coefficient information corresponding to the second pixel.

10. An operating method of an image processing device, the operating method comprising:
obtaining kernel coefficient information corresponding to each pixel of a plurality of pixels included in a first image, using a convolution neural network comprising one or more convolution layers,
generating a spatially variant kernel comprising a kernel corresponding to the each pixel, based on a gradient kernel set comprising a plurality of gradient kernels corresponding to one or more gradient characteristics of the plurality of pixels, and the kernel coefficient information, and
generating a second image, by applying the kernel included in the spatially variant kernel to a region centered on the each pixel and filtering the first image.

11. The operating method of claim 10, wherein the one or more gradient characteristics of the plurality of pixels comprise at least one of a strength characteristic, an angle characteristic, or a coherence represented by the plurality of pixels.

12. The operating method of claim 10, wherein the plurality of gradient kernels are trained using a training data set comprising low resolution images, and high resolution images respectively corresponding to the low resolution images, and
wherein the plurality of gradient kernels are trained according to gradient characteristics of a plurality of image patches included in the low resolution images.

13. The operating method of claim 12, wherein the plurality of gradient kernels comprise a plurality of kernels trained according to a strength characteristic, an angle characteristic, and a coherence represented by the plurality of image patches.

14. The operating method of claim 10, wherein a number of kernel coefficients included in the kernel coefficient information corresponding to the each pixel is same as a number of the plurality of gradient kernels included in the gradient kernel set, and
wherein each kernel coefficient of the kernel coefficients included in the kernel coefficient information represents a weight corresponding to each of the plurality of gradient kernels.

15. A non-transitory computer-readable recording media having stored therein a program which, when executed by at least one processor, causes the at least one processor to:
obtain kernel coefficient information corresponding to each pixel of a plurality of pixels included in a first image, using a convolution neural network comprising one or more convolution layers,
generate a spatially variant kernel comprising a kernel corresponding to the each pixel, based on a gradient kernel set comprising a plurality of gradient kernels corresponding to one or more gradient characteristics of the plurality of pixels, and the kernel coefficient information, and
generate a second image, by applying the kernel included in the spatially variant kernel to a region centered on the each pixel and filtering the first image.

* * * * *